US 6,713,709 B2

(12) United States Patent
Sanders et al.

(10) Patent No.: US 6,713,709 B2
(45) Date of Patent: Mar. 30, 2004

(54) PROCESS AND APPARATUS FOR CUTTING OR WELDING A WORKPIECE

(75) Inventors: Nicholas A. Sanders, Norwich, VT (US); Richard W. Couch, Norwich, NH (US); Yong Yang, Hanover, NH (US); Zhipeng Lu, Hanover, NH (US); Robert C. Dean, Norwich, VT (US); Kenneth J. Woods, Lebanon, NH (US); Charles M. Hackett, Hanover, NH (US); John Sobr, Lebanon, NH (US); William J. Connally, Grantham, NH (US)

(73) Assignee: Hypertherm, Inc., Hanover, NH (US)

( * ) Notice: Subject to any disclaimer, the term of this patent is extended or adjusted under 35 U.S.C. 154(b) by 0 days.

(21) Appl. No.: 10/315,385

(22) Filed: Dec. 10, 2002

(65) Prior Publication Data

US 2003/0121894 A1 Jul. 3, 2003

Related U.S. Application Data

(63) Continuation of application No. 09/665,650, filed on Sep. 20, 2000, now Pat. No. 6,525,291.
(60) Provisional application No. 60/155,078, filed on Sep. 21, 1999.

(51) Int. Cl.$^7$ ............................................... B23K 10/00
(52) U.S. Cl. .............................. 219/121.39; 219/121.48
(58) Field of Search ...................... 219/121.39, 121.48, 219/121.5, 121.52, 121.18, 121.11, 121.2, 618, 636, 637, 628; 75/626, 240, 340; 428/468; 216/83; 164/46; 373/149

(56) References Cited

U.S. PATENT DOCUMENTS

| 3,567,898 | A | * | 3/1971 | Fein ........................ 219/121.5 |
| 4,234,336 | A | * | 11/1980 | Rechin et al. ................. 75/626 |
| 4,380,138 | A | | 4/1983 | Hofer .......................... 451/40 |
| 4,446,562 | A | * | 5/1984 | Friedmann et al. ......... 373/149 |
| 4,691,090 | A | | 9/1987 | Garlanov et al. ..... 219/121 PC |
| 4,744,821 | A | * | 5/1988 | Yabuki et al. ................ 75/340 |
| 5,288,960 | A | * | 2/1994 | Rothe et al. ................. 219/618 |
| 5,587,093 | A | * | 12/1996 | Aston .................... 219/121.48 |
| 5,637,816 | A | * | 6/1997 | Schneibel .................... 75/240 |
| 5,800,924 | A | * | 9/1998 | Metter ........................ 428/408 |
| 5,951,882 | A | * | 9/1999 | Simmons et al. ............. 216/83 |
| 6,296,043 | B1 | * | 10/2001 | Bowen et al. ................ 164/46 |

FOREIGN PATENT DOCUMENTS

| DE | 195 07 700 A1 | 9/1996 | ........... B23K/28/00 |
| EP | 0 919 317 A | 6/1999 | ........... B23K/10/01 |
| RU | 2116171 C1 | 7/1998 | ........... B23D/31/00 |

* cited by examiner

Primary Examiner—Quang T. Van
(74) Attorney, Agent, or Firm—Testa, Hurwitz & Thibeault, LLP

(57) ABSTRACT

A metal jet cutting system, which includes a jetting heat, a heater and a power source, is used for modifying a workpiece. The jetting head includes a crucible and an inlet for receiving a feed stock of a conductive material. The heater melts the conductive material in the crucible to provide a conductive fluid, which exits the jetting head via an outlet. The power source, which is in electrical communication with the conductive fluid, increases the temperature of the conductive fluid. The conductive fluid is applied to the workpiece to modify the workpiece.

32 Claims, 9 Drawing Sheets

PROCESS AND APPARATUS FOR CUTTING OR WELDING A WORKPIECE

RELATED APPLICATIONS

This application is a continuation application of U.S. application Ser. No. 09/665,650 filed on Sep. 20, 2000 now U.S. Pat. No. 6,525,291.

This application claims priority to and incorporates herein by reference in its entirety U.S. Provisional Application Ser. No. 60/155,078, filed Sep. 21, 1999, entitled Process and Apparatus For Cutting Or Welding A Workpiece.

FIELD OF THE INVENTION

The invention relates to a process and an apparatus for cutting or welding a workpiece.

BACKGROUND OF THE INVENTION

Oxyfuel cutting, plasma cutting, and laser cutting are three principal methods used to thermally cut a metallic workpiece. Oxyfuel cutting is mainly used to cut mild steel where the benefits of the exothermic burning reaction of oxygen and iron are used to do the cutting. In this process, the reaction rate and the resulting cutting rate is determined by the diffusion rates of the reactants and the shear of the gas jet on the liquid metal to remove it from the cut. For cutting a mild steel workpiece having a thickness in the range from about 10 mm to about 12 mm, typical cutting speeds range from about 0.5 to about 1.5 meters/minute. Kerf widths vary from about 1 mm to greater than about 3 mm.

In plasma cutting, the energy used to cut a workpiece is supplied by an electric-arc-heated plasma gas jet which is directed toward or brought in contact with the workpiece. The plasma cutting technique works on all types of electrically-conductive materials and, therefore, has a wider application range than oxy-fuel cutting. Typical plasma arc temperatures are greater than 6000° C. During plasma cutting, metal from the workpiece is removed from the kerf by the shear of the very high velocity plasma-arc jet. Typical cutting speeds for plasma cutting are greater than those of oxyfuel cutting. A typical cutting speed for cutting ½" mild steel with oxy-fuel is about 16 inches/min; whereas a 200 Amp plasma system would typically cut that same size material at 80 inches/min. Kerf widths for plasma cutting are about the same size or larger then those for oxyfuel cutting. The relatively large kerf width has an adverse influence on the precision of the plasma cutting process.

In laser cutting, the energy used to cut a workpiece is supplied by a laser beam directed toward or brought in contact with the workpiece. Material is removed from the kerf by the shear from an assist gas jet directed into the kerf. In laser cutting, kerf widths are narrow. Kerf widths typically range from about 0.15 mm to about 0.5 mm. These narrow kerf widths consequently yield higher precision cutting than is possible with either oxyfuel or plasma cutting. However, in laser cutting, it becomes difficult to remove the molten metal from the kerf as the workpiece thickness increases. This limits the cutting speed and the maximum thickness capability for laser cutting. It is believed that the reason for this limitation is that the high gas velocity required to achieve sufficient gas shear creates supersonic shock waves a few millimeters into the kerf. These shock waves limit the gas shear and its ability to remove metal.

A fourth method for thermally cutting a workpiece is disclosed in U.S. Pat. No. 5,288,960. In this thermal-cutting method, a high temperature liquid metal stream is directed at and impinges on the workpiece. The temperature of the stream exceeds the melting temperature of the workpiece. The problem of removing the molten metal from the kerf because of limited gas shear encountered in laser cutting is thus eased by using a medium (i.e., liquid) with a higher specific density. Compared to laser cutting, higher cutting speeds, thicker workpiece capability, and equivalent high precision cuts can be realized with this liquid-metal-stream cutting approach. However, because of the need to supply a high speed liquid stream to the workpiece, at a temperature greater than the workpiece melting point, this approach has been limited in its use for cutting certain metal. The material requirements for a high temperature, high pressure, liquid containment vessel severely limits the practicality of cutting metals such as aluminum, stainless steel and mild steel, where typical melting temperatures are 660° C., 1400° C. and 1550° C., respectively.

Several methods are used to thermally weld a workpiece. The most widely used welding processes use heat sources to cause localized heating of two or more workpieces, allowing them to melt and flow together. A filler metal generally is added to the weld area in order to supply sufficient material to fill the joint and to increase mechanical strength. For example, a fillet weld generally forms a radial sector of additional material over a weld groove when completed. When the welding process is progressing, a molten pool of workpiece forms and a filler material is moved along the welding front. When the welding heat source is removed, the molten metal solidifies, and the parts are fused or welded together. Common heat sources used to provide heat to melt the workpieces are DC or AC electrical arc, oxy-fuel gas flame, and laser beam.

SUMMARY OF THE INVENTION

An objective of this invention is to provide a very high energy density fluid stream which can be used in materials working processes. Another objective of this invention is to provide a process and an apparatus for thermally cutting workpieces at high speed and high precision over a large range of workpiece thicknesses. Another objective of this invention is to provide a process and an apparatus for thermally welding workpieces at high speed and high precision. Another objective of this invention is to thermally cut and/or weld non-metallic and/or non-conducting materials. A further objective of this invention is to provide a process and an apparatus of cutting and/or welding which is simple in design, easy to operate and maintain and cost effective to use.

In one aspect, the invention features a system for modifying a workpiece. The system comprises a dispenser and a power source. The dispenser comprises an electrically conductive material for forming a jet stream. The power source is electrically coupled to the jet stream.

In one embodiment, the dispenser comprises a jetting head. For example, the jetting head can comprise a crucible. A heater can be coupled to the crucible. The heater can comprise one of an AC resistance heater, a DC resistance heater, an induction heater, or a combustion burner-heater arrangement. The heater can comprise an induction heater coil wrapped around the crucible. In one example, the induction heater coil wrapped around a first end of the crucible has a closer packed relationship than the induction coil wrapped around a second end of the crucible. In another example, the induction heater coil wrapped around a first end of the crucible has a smaller diameter than the induction coil wrapped around a second end of the crucible. The system can further comprise a depressurizing vent in communication with the pressure containment vessel. The crucible can comprise a refractory material. For example, the crucible can comprise a material selected from one of zirconium diboride, alumina, zirconia, boron nitride, and graphite. The conductive material for forming the jet stream can comprise a metal.

The jetting head can comprise an inlet for receiving a feed stock of the conductive material. In another embodiment the jetting head can comprise multiple inlets for receiving multiple feed stocks of conductive material. The jetting head can further comprise a feed stock valve. The jetting head can comprise a pressure containment vessel and a heater disposed inside the pressure containment vessel. The system can further comprise a pressurizing gas source in communication with the pressure containment vessel. The jetting head can comprise an electrode disposed inside the crucible for establishing an electrical connection with the jet stream.

The jetting head can comprise an exit orifice. In addition, the jetting head can further comprise a plug. In this embodiment, the jetting head can comprise a plug rod disposed above the exit orifice. The jetting head can further comprise a nozzle. The nozzle can comprise a disk having a conical opening. The jetting head can further comprise a nozzle and a nozzle cap detachably attached to the pressure containment vessel adjacent the nozzle. In one embodiment a filter can be placed in series with the nozzle. In another embodiment the crucible has a conductive fluid filter.

In one embodiment, the system for modifying a workpiece further comprises a first lead electrically coupled to the power supply and a work piece and a second lead electrically coupled to the power supply and a conductive fluid disposed in the crucible. In another embodiment, the system of can further comprise a first lead electrically coupled to the power supply and a work piece clamp and a second lead electrically coupled to the power supply and a conductive fluid disposed in the crucible. In still another embodiment, the system can further comprise a first lead electrically coupled to the power supply and a current collector. For example, the current collector can comprise a vessel.

In still another embodiment, the system can further comprises a first lead electrically coupled to a first power supply and a first feedstock and a second lead electrically coupled to the first power supply and a second feedstock. The first and second feedstocks making electrical contact with the conductive fluid disposed in the crucible. The two feedstocks are heated by passing current between them. A second power supply comprises a first lead electrically coupled to the work piece and a second lead electrically coupled to the power supply and a feedstock of the first power supply.

The jetting head can further comprise a shield assembly supporting the nozzle. The shield assembly can comprise a disk having a plurality of inlet orifices for introducing a shield gas to the jet stream.

In another aspect, the invention features a metal jet cutting system. The system comprises a jetting head including an exit orifice for dispensing a jet stream of a conductive fluid and a power source electrically coupled to the jet stream for providing a current to the jet stream to increase a temperature of the jet stream above a melting temperature of the conductive fluid.

In still another aspect, the invention features a process for modifying a workpiece. According to the process, a jet stream comprising a conductive fluid is provided. An electrical current is passed through the jet stream. The jet stream is directed at the workpiece for modifying the workpiece.

The jet stream can be heated in a variety of ways. A current can be applied to the jet stream through an electrode coupled to the conductive fluid and a current collector disposed near the workpiece. A current can be applied to the jet stream through an electrode coupled to the conductive fluid and a workpiece clamp. The jet stream can be heated through ohmic power dissipation. The jet stream can be heated to a temperature substantially above a melting temperature of the conductive fluid. A temperature of the jet stream can be increased up to about 1000° C. above a melting temperature of the conductive fluid. The jet steam can be a continuous jet stream, a pulsed jet stream, a steady jet stream, or an unsteady jet stream.

In one embodiment the heater of the crucible is an induction heater where the characteristic frequency of the induction heater can be calibrated to the level of a conductive fluid in the curcible.

In one embodiment, the feed stock and the workpiece comprise the same type of material. Alternatively, the feed stock can the workpiece can comprise different types materials. For example, the feed stock can comprise aluminum and the workpiece can comprise stainless steel. The feed stock can be a conductive fluid. Alternatively, the feedstock can be heated to form a conductive fluid. In one example, the feed stock is a metal such as aluminum, iron, an iron containing compound, tin, nickel, titanium, gold, platinum, silver, magnesium, copper, mild steel or aluminum-iron alloy. The feed stock can comprise a wire, bar, or powder. In still another embodiment the feedstock can comprise a wire or bar and also serve as an electrical contact between a power source and the conductive fluid. More than one feed stock can be in contact with an electrical power source. The feed stock can comprise a plurality of non-melting particles. The non-melting particles can be abrasive. The feed stock can have a low melting point and a high boiling point.

The exit orifice of the crucible can be plugged while providing the feed stock and the exit orifice can be unplugged while the conductive fluid passes through the exit orifice. A vacuum can be provided to the jetting head to plug the exit orifice. A levitation force can be provided to the conductive fluid to plug the exit orifice.

In one embodiment, the jetting head is pressurized while passing the conductive fluid through the exit orifice. For example, the jetting head can be pressurized by supplying an inert gas.

In another aspect, the invention features a crucible for a metal jet cutting system. The crucible comprises side walls and a base. The crucible is electrically conductive and is resistant to dissolving in the presence of a metallic melt. The crucible can be formed from a zirconium containing compound. The crucible can also be formed from zirconia diboride or yitria-stabilized-zirconia.

In another aspect, the invention features a nozzle for a metal jet cutting system. The nozzle comprises a disk-structure having an orifice, wherein the orifice is located at a center of the disk-structure. The nozzle is electrically conductive and is resistant to dissolving in the presence of a metallic melt. The nozzle can be formed from a zirconium containing compound. The nozzle can also be formed from zirconium diboride.

Various parameters can be controlled when the process of the present invention is performed. For example, a pressure in the jetting head, a temperature of the conductive fluid, a depth of penetration of the jet stream and/or a velocity of the jet stream can be controlled.

In one embodiment, the workpiece can be cut, marked or pierced. Alternatively, the workpiece can be welded. For example in welding, a first workpiece having a first tapered edge and a second workpiece having a second tapered edge are provided. The first tapered edge is positioned adjacent the second tapered edge to provide a groove. The jet stream is directed at the groove to fill the groove. Directing the jet stream at the groove can melt a portion of the workpiece forming a molten pool in the groove. Cooling the molten pool welds the first workpiece and the second workpiece.

In one embodiment, a workpiece can be modified by lowering a melting point of the workpiece. The melting point can be lowered by forming an alloy of the feed stock material and the workpiece material on a surface of a portion of the workpiece. The process of modifying a workpiece can further include providing a shielding gas to shield the jet stream.

In one embodiment, the process of modifying the workpiece can be used to modify an insulative material. When modifying an insulative material, a current collector comprising a conductive material can be disposed underneath the workpiece. The current collector forms an electrical contact with the jet stream.

BRIEF DESCRIPTION OF THE DRAWINGS

The foregoing and other objects, features and advantages of the present invention, as well as the invention itself, will be made fully understood from the following description and embodiments, when read together with the accompanying drawings, in which:

FIG. 4b shows a detailed cross-sectional view of the nozzle area of the jetting head of FIG. 4a.

DETAILED DESCRIPTION

Figure 1A:
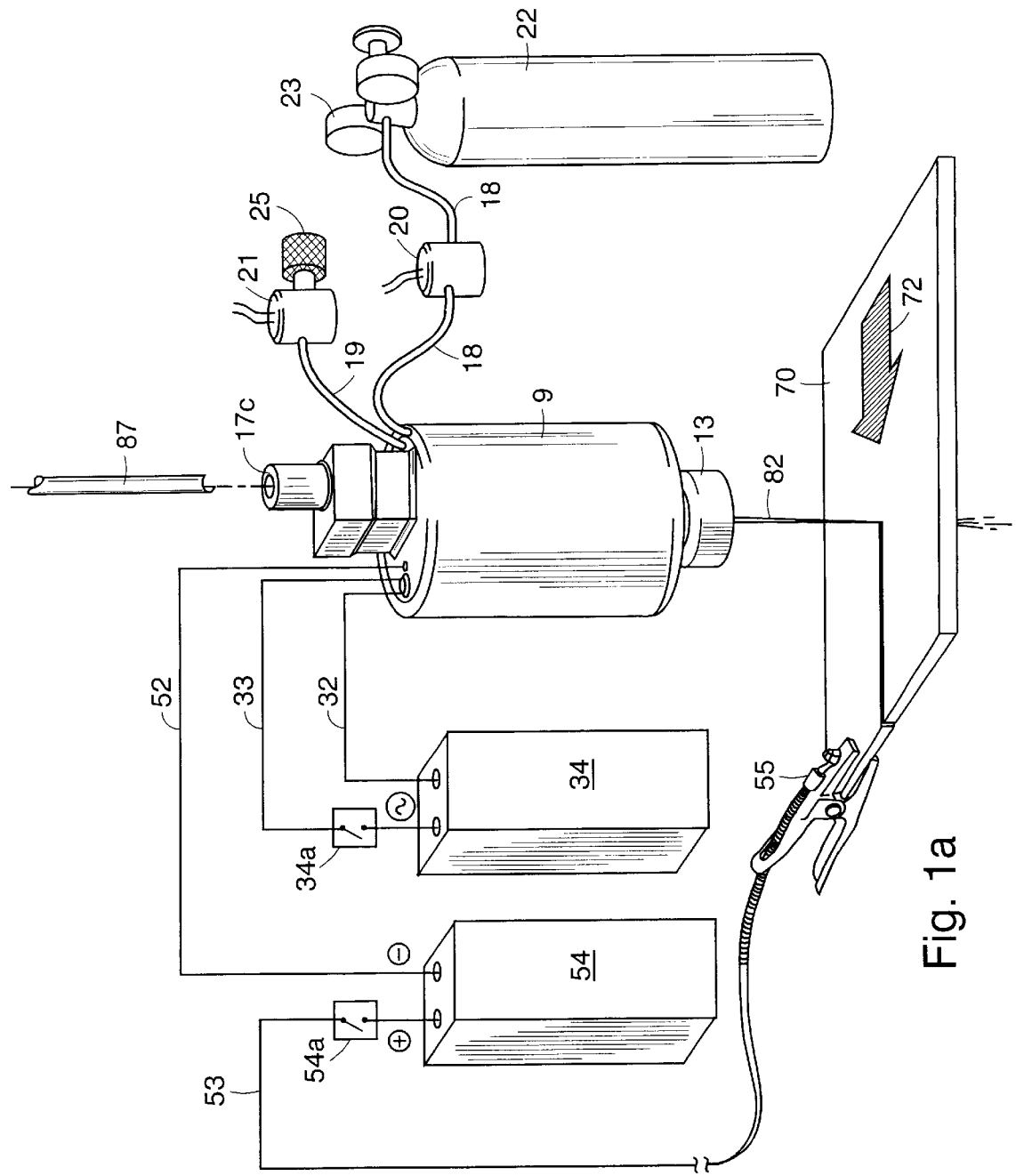
FIG. 1a shows a schematic view of an apparatus for cutting a workpiece according to one embodiment of the invention.

In one aspect, the invention features a process and an apparatus, in which a workpiece is either cut or welded by an impinging, fine stream of high temperature liquid metal working fluid. In one embodiment, the liquid metal working fluid is formed by melting and then holding the working fluid in a heated crucible. The temperature of the metal working fluid in the crucible is maintained at a temperature above its melting point. During operation, the working fluid is heated under pressure in the crucible and subsequently directed toward the workpiece as a jet stream passing through a nozzle orifice located at an outlet of the crucible.

In one embodiment, an electrical power source is connected between the liquid metal working fluid in the crucible and an electrically-conducting workpiece or an alternative electrode positioned beneath the cut workpiece. During operation, an electric current is passed between the liquid metal working fluid in the crucible and the workpiece or the alternative electrode via the liquid metal stream. The passage of current through the small diameter liquid stream heats the jet stream by ohmic ($I^2R$) power dissipation (where I represents the electrical current and R represents the electrical resistance). The temperature increase of the stream, enroute to the workpiece, is dependent on: a) the electrical power input to the stream; b) the stream mass flow rate; and c) the heat capacity (specific heat) of the liquid. Since the power input to the stream is an independent variable, which may be operator controlled, energy can be added to the stream to increase its temperature, as desired. This reduces the high temperature demands from crucible construction materials and makes it feasible to cut or weld materials with high melting-point temperatures using working fluids that have much lower melting points. High melting point workpiece materials can be worked (either cut, welded or brazed) by adding whatever temperature is required for the working fluid enroute to the workpiece. For example, mild steel and stainless steel, which have approximate melting points of 1550° C. and 1400° C., respectively, can be cut with low melting point working fluids such as aluminum or tin alloys, which have approximate melting temperature of 660° C. and 232° C., respectively, by adding whatever additional temperature is required by $I^2R$ power dissipation in the liquid metal stream.

As an illustration of the invention's improvement in the cutting process, the following Table 1 compares the typical theoretical cross-sectional power densities of the above mentioned cutting processes. The cutting speeds and process parameters are assumed to be typical for each process. The power density is calculated for each process as the energy passing through a cross-sectional diameter equal in size to the kerf width associated with each process. As can be seen in Table 1, the process of the present invention delivers, by far, more power per unit area than any of the other processes. This power density is an indication of the ability of the process of the present invention to deliver melting energy to a workpiece kerf.

TABLE 1

Typical Power Densities (W/mm$^2$) for Cutting Processes (cutting ½" mild steel, 1520° C. melt temp)

| Cutting Process | Power Density |
| --- | --- |
| 1. Oxy-fuel (oxygen-iron burning reaction, 2 mm kerf) | 14 |
| 2. Plasma (200 A, 100 V, 4 mm kerf) | 1,600 |
| 3. Laser (3 kW with oxygen assist, 0.4 mm kerf) | 24,000 |
| 4. Aluminum Jet (200 μm nozzle, 1750° C. jet, 0.2 mm kerf) | 14,600 |
| 5. Aluminum Jet w/I$^2$R Heating (200 μm nozzle, 1750° C. jet + 1.2 kW I$^2$R, 0.2 mm kerf) | 53,000 |
| 6. Aluminum Jet w/I$^2$R Heating (200 μm nozzle, 900° C. jet + 2.1 kW I$^2$R, 0.2 mm kerf) | 30,000 |

As shown in the Table 1, the initial temperature of the aluminum jet (900° C.) can be less then the melting temperature of the workpiece (1520° C.), with the additional temperature needed to cut the workpiece coming from the added $I^2R$ power dissipation.

Figure 1B:
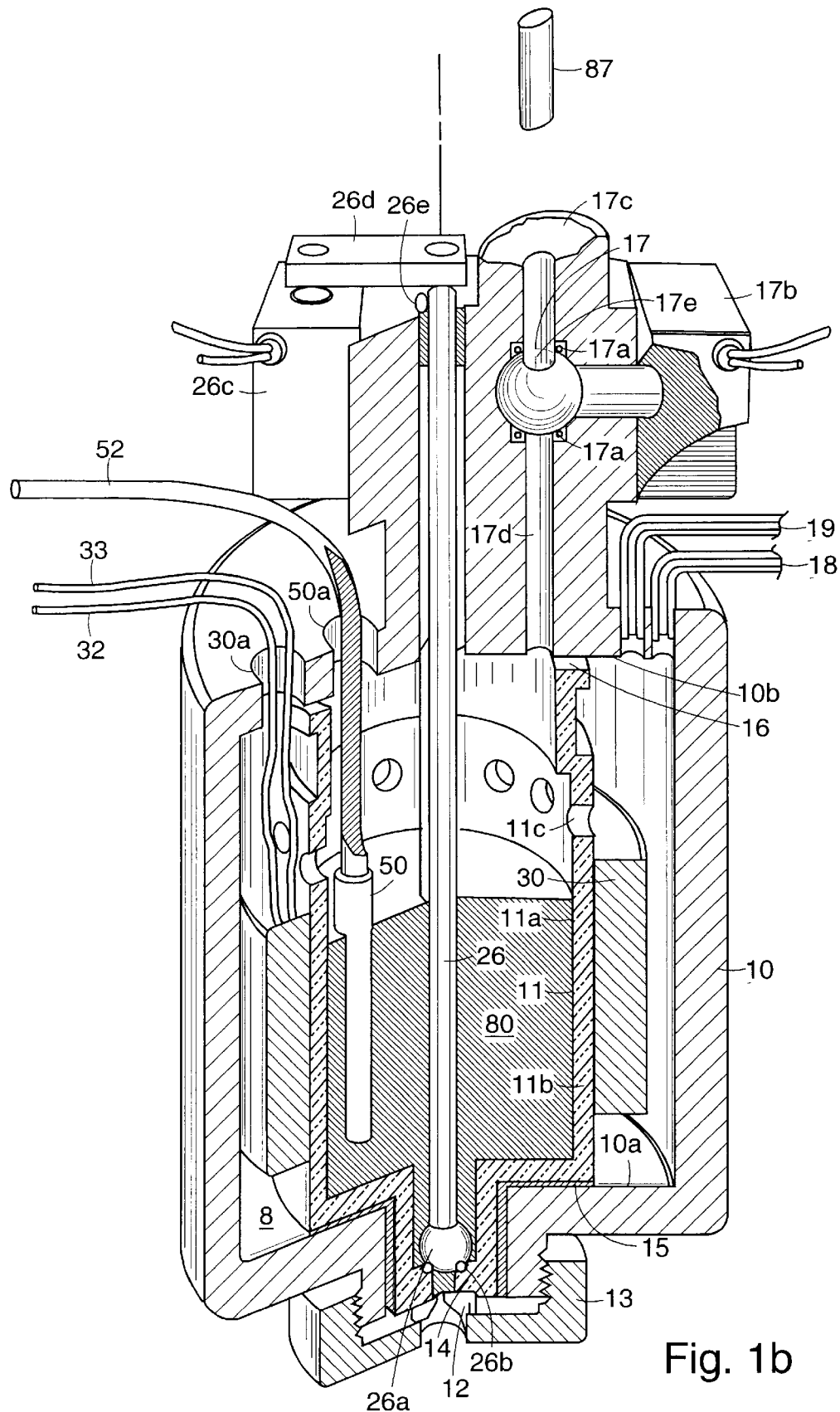
FIG. 1b shows an inside view of the jetting head of FIG. 1a according to one embodiment of the invention.
Figure 1C:
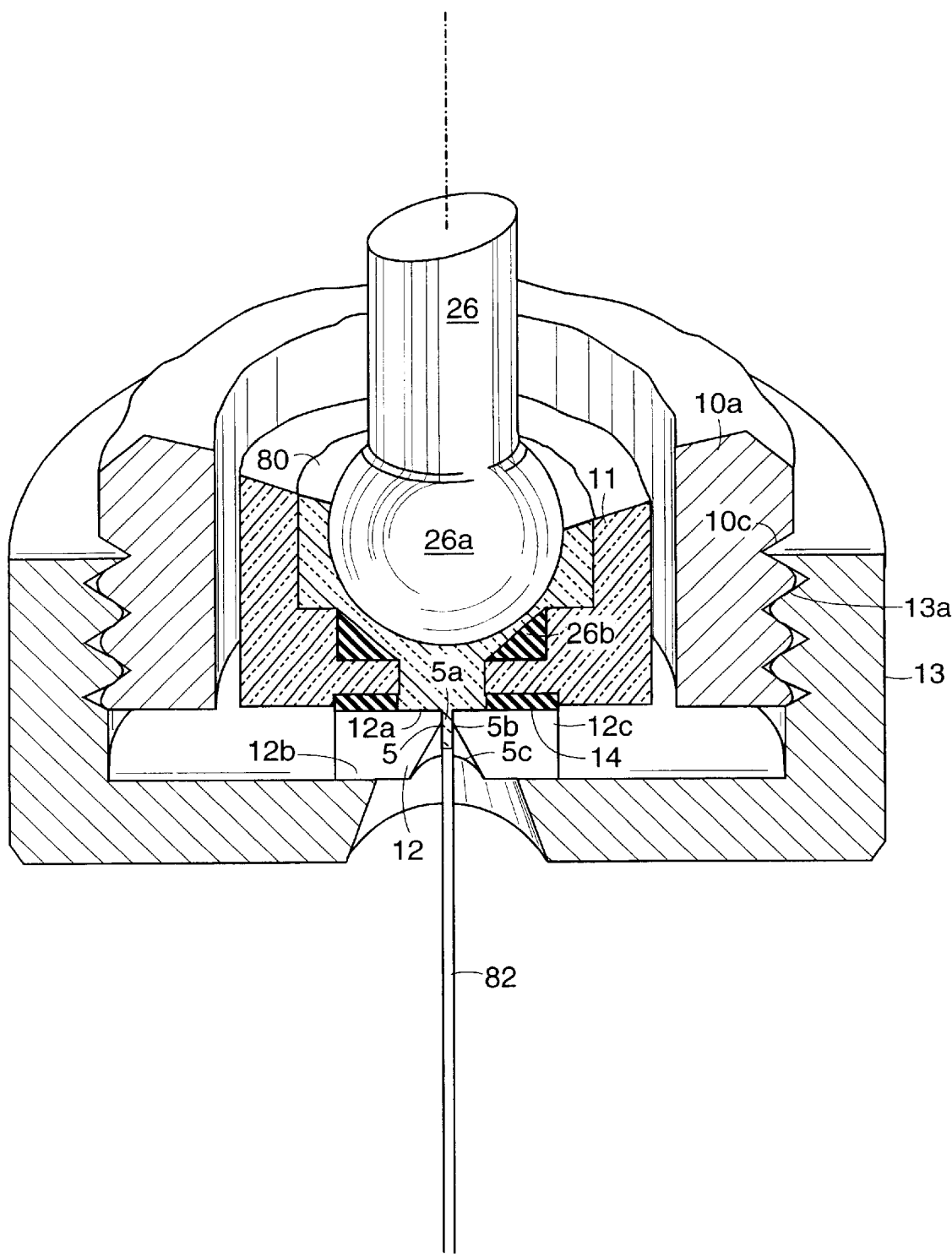
FIG. 1c shows a detailed cross-sectional view of the nozzle area of the jetting head of FIG. 1b.

Referring to FIGS. 1a, 1b, and 1c, an apparatus for cutting or welding a workpiece includes a jetting head (9), a crucible heater power supply (34), a stream heating power supply (54), and a pressurizing gas source (22). The crucible power supply (34) is electrically connected to the jetting head (9) through a pair of leads (32) (33). The stream heating power supply (54) is electrically connected to the jetting head (9) through a negative lead (52) and to a workpiece (70) through a positive lead (53). Gas from the gas source (22) is supplied to the jetting head (9) through a pressurizing gas source interconnecting piping (18), a pressurizing gas source regulator (23), and a pressurizing gas source on/off valve (20). The jetting head (9) is de-pressurized through a de-pressurizing vent (25), a de-pressurizing vent interconnecting piping (19), and a de-pressurizing vent on/off valve (21).

The jetting head (9) includes a pressure containment vessel (10), a crucible (11), a crucible heater (30), a feedthrough (30a) for the pair of leads (32) (33), a stream heating electrode (50), a feedthrough (50a) for the negative lead (52), a plug rod (26), a plug rod actuator (26c), a plug rod seal (26e), a plug rod ball (26a), a plug rod ball seat (26b), a crucible compliant top seal (16), a crucible bottom sealing gasket (15), a nozzle disk (12), a nozzle disk sealing gasket (14), a nozzle nut (13) and a molten metal working fluid (80).

The feedstock (87) is fed into the jetting head (9) through the feedstock inlet (17c). The feedstock (87) can be introduced into the jetting head (9) in either solid form as shown, where the melting and liquid forming takes place in the crucible (11), or the feedstock can be introduced in liquid form, where the melting and forming of the liquid metal takes place outside of the jetting head (9), prior to its introduction into feedstock inlet (17c). In either case, working material moves into the jetting head (9) through the feedstock passage (17d) and into the crucible (11). During operation, the heated crucible (11) maintains the feedstock (87) in a molten state. The feedstock (87) is fed through the opening (17e) in the feedstock valve (17) when the opening (17e) is aligned with the passage (17d). When closed by feedstock valve actuator (17b), the opening (17e) no longer aligns with the passage (17d), the passage (17d) is then gas-tight sealed by seals (17a). The feedstock valve (17) allows the interior of the jetting head (9) to be pressurized.

The crucible (11) is heated by the crucible heater (30). The crucible heater (30) can be any heater which heats the crucible (11) to the desired temperature. For example, the heater (30) can be AC or DC resistance heater, an induction heater, or a combustion burner-heater. In one embodiment, an AC electrical resistance heater is used. This heater has power connections (32) and (33), which are, in turn connected to the crucible heater power supply (34). Power leads (32) and (33) pass through the pressure vessel top (10b) via crucible heater electrical feedthrough (30a). This feedthrough (30a) makes a gas pressure seal with the pressure vessel top (10b) and insulates the leads electrically.

In one embodiment, the crucible (11) has side walls and a base. The crucible (11) is made of a refractory material, which is compatible with the high temperature molten working fluid so that the crucible is resistant to dissolving in the presence of a metallic melt. Examples of suitable crucible materials include, but are not limited to, zirconium containing compounds, alumina and zirconia ceramics of various compositions, boron nitride materials of various compositions, boron nitride, boron nitride-zirconia-silicon carbide, silica, zirconium diboride, Yttria-Stabilized-Zirconia, Magnesia-Stabilized-Zirconia, Calcia-Stabilized-Zirconia, Cubic Zirconia, silica composites, and graphite. In one embodiment, the crucible material can be boron nitride materials, such as Grade ZSBN material, which is made up of boron nitride-zirconia-silicon carbide, supplied from The Carborundum Company located in Amhurst, N.Y. In another embodiment, the crucible is made of graphite. Since graphite is electrically conductive it may be desirable to electrically isolate the crucible (11) from the pressure containment vessel (10) and the crucible heater (30). In one embodiment, the crucible (11) is electrically isolated. The bottom end of the crucible (11) is sealed by the crucible bottom gasket (15) located on the bottom of the crucible (11), between the crucible (11) and the pressure vessel bottom (10a). In one detailed embodiment, the gasket (15) is made of high temperature alumina refractory gasket material, which is an electrical insulator. The gasket (15) is loaded under pressure from the compliant seal (16) located on the top of the crucible (11), between the crucible (11) and the top of the pressure vessel (10b).

In one embodiment, the outlet for the liquid metal working fluid is sealed by the movable plug rod ball (26a), which is in a sealing fit relationship with the plug rod ball seat (26b). The plug rod actuator (26c) applies a sealing force through arm (26d) to the plug rod (26), which forces the plug rod ball (26a) on to the plug rod ball seat (26b) during times of no liquid metal flow. Since the crucible (11), the plug rod (26), the plug rod ball (26a) and the plug rod ball seat (26b) are in contact with the liquid metal (80), the construction materials for these components must be chosen so that they will withstand the mechanical and thermal stresses at high temperature and resist corrosion in a chemically reactive environment. In addition, the plug rod ball (26a) and plug rod ball seat (26b) must be made of materials which will together make a good intermittent seal of the liquid metal under pressure. It is anticipated that working pressures will range from about 50 to about 5000 psi. In addition, in one embodiment, the plug rod (26) and the plug rod ball (26a) are electrically isolated and/or made of electrically non-conducting material in order to electrically isolate the working fluid resistance heating power supply (54) from other current paths. The electrical isolation of the crucible and plug rod parts would not be necessary if the entire jetting head assembly were allowed to 'float' electrically at the same potential as the crucible. The plug rod (26) is sealed on the pressure vessel top (10b) by plug rod pressure seal (26e).

In one embodiment, the stream-heating power source (54) is connected to the working fluid (80) by an electrode (50) which extends down into the crucible (11) and is generally surrounded by and in good electrical contact with the liquid metal working fluid (80). The electrode (50) is connected to the power supply (54) by a connecting wire (52), which passes through the top (10b) of the pressure vessel via the feedthrough (50a). This feedthrough (50a) makes a gas pressure seal and electrical insulation with the top (10b) of the pressure vessel. The opposite polarity of the stream heating power supply (54) is connected via cable (53), switch (54a) and electrical clamping means (55) to workpiece (70).

FIG. 1c shows an enlarged view of the nozzle area. The nozzle area includes a nozzle disk (12). The nozzle disk (12) is a cylindrical disk having a top (12a), a bottom (12b) and an outside diameter wall (12c). An orifice (5) is formed at the top (12a) of the nozzle disk (12) on the centerline. The orifice (5) has a bore (5a) and a length (5b). A conical opening (5c) extends from the outlet of orifice (5) to the bottom (12b) of the nozzle disk (12). Typical orifice diameters can range from about 25 to 500 µm. The nozzle disk (12), in one embodiment, is made out of a material which is electrically conductive and resistant to dissolving in the presence of a metallic melt, and the nozzle disk (12) can be formed with a precise, small diameter orifice and which can function in the severe environment of high temperature liquid metals. The nozzle disk (12), like the crucible (11) can also be made out of zirconium containing compounds such as Yttria-Stablized-Zirconia, Magnesia-Stablized-Zirconia, Calcia-Stablized-Zirconia, boron nitride, boron nitride-zirconia-silicon carbide, Cubic Zirconia, Alumina, Silica, Silica Composites, Zirconium Diboride. In one detailed embodiment, the material for the nozzle disk (12) is sapphire (e.g., alumina). The nozzle disk (12) is held against the nozzle sealing gasket (14) by pressure applied by a nozzle cap (13). The nozzle cap (13) has a threaded portion (13a) which is attached to the bottom (10a) of the pressure vessel on threaded portion (10c). In one embodiment, the nozzle sealing gasket (14) is made of a material which can function in the severe environment of high temperature liquid metals. For example, the gasket material can be graphite, such as the 'Calgraph™' material supplied by SGL Technic Inc. of Valencia, Calif.

The outside boundary of the jetting head interior is defined by the inside wall of the pressure containment vessel (10). This pressure vessel (10) must be made of material which can maintain high strength at high pressure and elevated temperature, such as 'Inconel™ 600', which is a high nickel, super alloy available from the Inco Alloys International Co. The pressure containment vessel (10) is pressurized through a pressurizing gas source piping (18) which is connected to the pressurizing regulator (23) and the pressurizing gas source (22). An on/off valve (20) is located some where along the pressurizing gas source piping (18). The pressure containment vessel (10) is de-pressurized through the de-pressurizing gas vent piping (19) which is connected to the de-pressurizing gas vent (25). An on/off valve (21) is located somewhere along the de-pressurizing gas vent piping (19). The embodiment of FIG. 1b is designed so that the walls of the high temperature crucible are not subjected to the high stresses caused by the periodic pressurization of the jetting head (9). This is accomplished by allowing the pressurizing gas flow to have access to both the inside wall (11a) and the outside wall (11b) of the crucible (11). The pressurizing gas is allowed to flow freely through gas passages (11c) of the crucible (11). The internal cavity (8), which is all of the free space in the jetting head between the outside of crucible (11) and the interior walls of the pressure containment vessel (10) acts as a very effective thermal insulation barrier. This space, however, acts as a gas capacitance when charging and discharging the vessel with high pressure. In order to minimize this capacitance, the internal cavity (8) may be filled with a non-porous thermal insulation.

In one embodiment, feedstock (87) is fed into the jetting head (9) during times when the jetting head is not under pressure. The feedstock is held in crucible (11) and is then melted if the feedstock is fed in as a solid, and is maintained in molten state.

When the jetting head (9) is powered up, in preparation for cutting, the crucible power supply (34) is turned 'ON' by closing switch (34a), thus supplying power to the crucible heater (30). The crucible heater (30) will, by controls not shown, maintain the temperature of the working fluid (80) at a predetermined temperature somewhere above its melting point. The predetermined temperature is set by electronic monitoring controls which use feedback from temperature sensors located in or near the molten metal working fluid. This electronic control system and temperature sensors are not shown but are commercially available.

In one embodiment, an induction heater is used as a crucible heater (30). The induction heater can detect changes in the level of the molten metal working fluid in the crucible. A characteristic frequency of the induction heater changes with the level of the molten metal working fluid. In an induction heater, the material to be heated is coupled to the heater's coil by the magnetic fields inside the coil. The presence of the material and of the eddy currents induced in the material interact with and change the magnetic fields from the coil compared to what the fields would be without any material inside the coil. The additional impedance of the material changes the total impedance of the coil. The change in impedance of the coil changes the Q of the circuit and its resonant frequency. Therefore, the induction heater would operate at different frequencies for conditions where material is present or absent inside the coil. Similarly, varying amounts of material inside the coil would result in varying shifts in frequency. The characteristic frequency can be monitored and calibrated to measure the level of the molten metal working fluid.

The molten metal working fluid (80), which is formed from the feedstock (87) is specifically chosen for the particular application of interest. Although the working fluid is referred to as 'metal' the working fluid can, in fact, be any electrically conductive fluid which will produce the desired effects on the workpiece. Some materials that can be used for the feedstock (87) include mild steel, aluminum, aluminum alloy, tin, stainless steel, iron, cast iron, tool steel, copper, zinc, gold, silver, nickel, titanium, magnesium or platinum. For example, when the desired effect is to cut mild steel or stainless steel, the working fluid may be an aluminum or aluminum-iron alloy.

Aluminum and aluminum alloys have several properties that make them good choices for the working fluid; such alloys have low melting point temperature, high boiling point temperature, high specific heat capacity, high thermal conductivity and, a relatively low cost per kilogram. The melting point of pure aluminum is approximately 660° C., the melting point of aluminum-iron alloys (or metal mixtures) vary from approximately 660° C. to 1540° C. depending on the amount of iron in the mixture. The melting point of an aluminum-iron mixture with 90% aluminum content is approximately 800° C.

A major benefit of the present invention is the ability to use a working fluid at such temperatures because it makes possible the use of a number of available refractory materials for the crucible construction. Because pure iron melts at about 1540° C., it is obvious that additional temperature must be added to the stream, enroute to workpiece in order to cut. In addition, there is another benefit of using aluminum or aluminum alloys as the working fluid. That is, the temperature of an aluminum-iron alloy has a lower melting temperature then pure iron (or steel). Therefore, to the extent that the alloying process speed is fast enough, there will be this additional alloying process mechanism helping the cutting process when the stream combines (alloys) with a higher melting point workpiece metal. The alloying process, in general, will help the cutting process of all workpiece metals with melting points higher then that of the cutting stream by, in effect, lowering the melting point temperature of the workpiece metal in contact with the cutting (and alloying) stream.

As another example, a stainless steel workpiece could be cut using a working fluid which consists of a compound material, such as, an aluminum-magnesium alloy which also contains disperse amounts of fine ceramic particles, such as 0.5–25 μm alumina or zirconia particles. This cutting fluid has the advantage of having non-melting particles dispersed throughout the fluid to serve as abrasives to assist in the cutting process.

The present invention is not limited to be used with low melting temperature metal as the working fluid. For example, a mild steel workpiece can be cut with a mild steel, a cast iron, a tool steel or a pure iron working fluid. This choice of cutting fluid has the disadvantage of a high melting point. However, there are a few crucible materials which can withstand temperatures around the melting point (or fluidization) temperature of iron and since any temperature above the melting point that is required can be added outside of the crucible, with the $I^2R$ power dissipation, the use of pure iron as cutting fluid is possible in the present invention, and may be desirable in some cases. One benefit of using a mild steel or iron as a cutting fluid is that enroute oxide formation will not adversely affect the fluidity of the stream; iron oxide has a lower melting point then iron itself. Some high carbon steels have melting points less then that of pure iron which, therefore, make them candidate choices for cutting fluids. Other choices for cutting fluids for use in cutting mild steel include AISI 1006 through AISI 1095 steels, cast irons, and tool steels. In another example, if the workpiece to be cut is an aluminum alloy such as 6061, the working fluid can be a pure aluminum or an aluminum alloy. As still another example, if the workpiece to be cut is tin, the working fluid can be tin. In general there may be an advantage for the working fluid material to be the same material as the workpiece. For example when cutting, there would be no discernable metallurgical differences between the base metal of the workpiece and the metal on the cut face. In another example, when cutting 316 stainless steel there would be an advantage in using 316 stainless steel as the working fluid material in that the same alloying elements would exist through-out with no change in the area of the cut.

Just prior to the beginning of a cutting operation, the following conditions exist: a) the plug rod actuator (26c) is in the 'off' condition and the plug rod ball (26a) is sealing against the plug rod ball seat (26b); b) the feedstock valve (17) is closed and valve seals (17a) are sealing passage (17d) from the outside environment; c) the de-pressurizing gas venting valve (21) is in the 'off' condition and the venting path is closed; d) the pressurizing gas valve (20) is in the 'off' condition and the gas path to the pressurizing gas source is closed, and the pressurizing gas source is ready to supply gas to the jetting head; e) crucible heater power supply (34) is in the 'on' condition, switch (34a) is closed, and crucible heater (30) is supplying heat to crucible (11); f) the stream heating power supply (54) is turned 'on' and switch (54a) is closed so that the power supply is applying an electrical potential between the liquid metal fluid (80) and the workpiece (70).

The cutting operation is accomplished by first opening the pressurizing gas source valve (20) which pressurizes the interior of the pressure vessel (10), including the inside of the crucible. The pressurizing gas is selected to be non-oxidizing and inert to reactions with the molten metal. Possible choices for the pressurizing gas include argon, nitrogen, helium, and argon with some hydrogen. In one embodiment, the pressurizing gas is argon with 5% hydrogen added. The purpose of the hydrogen is to make the pressurizing atmosphere slightly 'reducing' in order to inhibit oxide formation. A special benefit of using iron as the working fluid is that the presence of oxygen in the pressurizing gas will not adversely affect the fluidization process since iron oxide, if formed, will be fluidized along with the pure iron. The presence of oxygen may, however, be undesirable for other components of the jetting head such as the crucible and/or sealing gaskets. Subsequently, the plug rod actuator (26c) is energized, which lifts by plug rod (26). The plug rod ball (26a) is thereby lifted from the seat (26b). As shown in FIG. 1c, liquid metal fluid (80) flows through nozzle orifice (5), forming a stream of liquid metal (82). When the stream contacts the workpiece (70), current will immediately begin to flow from the stream heating power supply (54) through the stream (82). This current flow immediately raises the stream temperature. As the high temperature stream impinges on the workpiece, it melts and erodes a pit until finally the heated stream penetrates all the way through the workpiece. At this point the workpiece has been pierced by the jet. Then finally relative movement (72) between the workpiece and the jetting head is started. These actions together cause the workpiece to be cut. The relative movement continues until the desired shape has been cut. At which point the relative movement can be stopped and stream (82) can be turned off by: a) opening switch (54a) which stops the current flow through the stream; b) de-energizing actuator (26c) which lowers plug rod (26), forcing plug rod ball (26a) on to seat (26b); c) de-energizing (closing) the pressurizing valve (20); d) energizing (opening) venting valve (21) which allows the pressurizing gas to flow out of the pressure vessel (10) through vent (25). The cutting sequence is then reset for the next cut by again closing switch (54a) so that the power supply is applying an electrical potential between the liquid metal fluid (80) and the workpiece (70). When it is desired to make the next cut the same sequence as above is followed. During a cutting or welding process the current flowing through the jet to the workpiece can sometimes form a plasma arc at or near the workpiece surface. This plasma arc formation can be detrimental to the cutting or welding process and may cause the process to become erratic resulting in poor cut or weld quality. It is important that steps be taken in controlling of the cutting or welding process to limit the arcing to a very minimum, or if possible, totally eliminate the arcing. One such step is to ensure the quality of the jet stream by employing filters to the working fluid prior to forming the jet. Filters for molten metals are commercially available. For example, filters for made of a typical composition of 93% zirconia, 5% magnesia and <2% alumina-silicates and other compounds are made for mild steel filtering and are available form the SELEE Corp of Hendersonville, N.C.

The following table summarizes results from cutting various materials using tin jet in accordance with the present invention. The $I^2R$ power was added to the tin jet via a DC power supply.

Liquid Metal Jet Cutting with Added $I^2R$ Heating
Tin jetting material
250 micron diameter nozzle
400 C. vessel temperature
400 psi vessel pressure

| Material Cut | Material Thickness [m] | Power [w] | Current [A] | Cut Speed [m/min] | Stand-Off [m] |
| --- | --- | --- | --- | --- | --- |
| Tin | 0.00635 | 714 | 54.9 | 14.8 | 0.016 |
| Aluminum | 0.00635 | 2500 | 75.3 | 3.8 | 0.022 |
| Mild Steel | 0.003175 | 1500 | 63.4 | 0.2 | 0.022 |
| Stainless Steel | 0.003175 | 2100 | 86.0 | 0.25 | 0.016 |

In another aspect, the present invention is directed to a welding apparatus and a method of welding a workpiece using the apparatus of FIGS. 1a–1c. The stream is additionally heated by I²R energy dissipation to elevate its temperature to a useful temperature for welding. Choice of filler material (working material stream) is selected, just as a specific welding rod is chosen in conventional welding. The stream velocity (which is governed by the pressure in pressure vessel), the diameter of the nozzle orifice and the orientation of the jetting head to the workpiece and stream temperature (I²R power dissipation) would be adjusted to set the depth of penetration. Because the stream velocity and thus mass flow rate can be varied from very high to very low values, the filler material can be added in much the same manner as wire in a conventional MIG welding processes, i.e., in a zig-zag (weaving) fashion. This allows a wider path of penetration in workpieces. FIG. 2a shows two pieces of metal (74a and 74b) pieces which have been prepared for a fillet type weld. Both (74a) and (74b) have tapered edges (74c) which are to be welded together. When the tapered edges are placed in the proper position for welding, the tapered edges form a groove (74d).

Figure 2B:
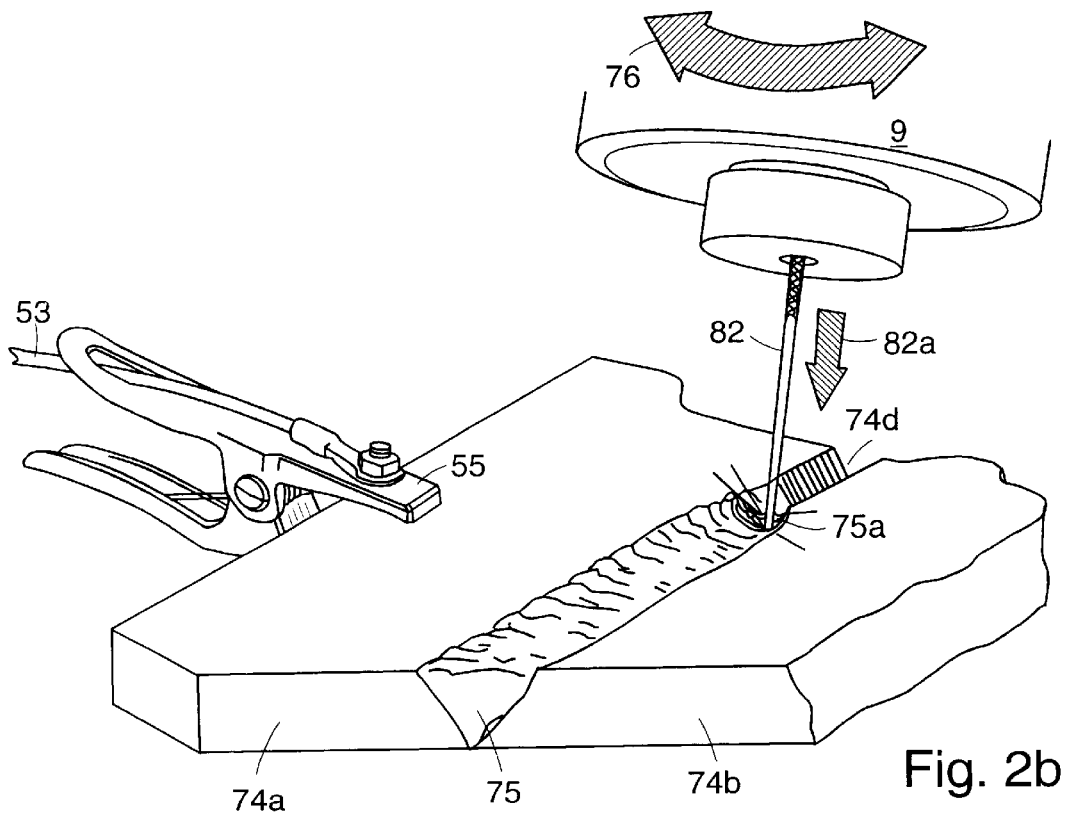
FIG. 2b illustrates welding the workpiece of FIG. 2a according to one embodiment of the invention.
Figure 2A:
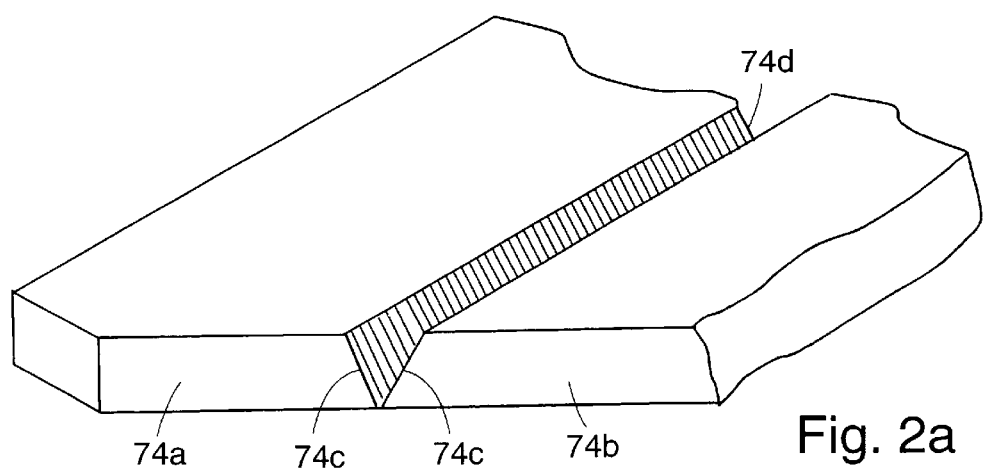
FIG. 2a shows a workpiece for welding according to one embodiment of the invention.

FIG. 2b illustrates a welding process using an apparatus of the present invention. Referring to FIG. 2, jetting head (9) and emanating stream (82) are directed toward the workpieces. The stream (82) makes contact with the two workpieces (74a) and (74b) somewhere in groove (74d) along one of the tapered edges (74c). After contact is made, electric current flows through the stream (82), the workpieces (74a) and (74b), and back to the stream heating power supply (54) (not shown in FIG. 2b) through clamp (55) and lead (53). The stream (82) is heated by I²R power dissipation, the same as in the case of cutting. As the I²R heated stream is moved along in relative motion (76) it heats and melts localized portions of edges (74c) as the workpieces (74a) and (74b) are being welded together. As the workpieces melt, a molten pool (75a) is formed by the molten portions of the workpieces and by the metal stream (82). Metal is continuously added to the pool by the stream (82). The amount of material added is controlled by the stream velocity (82a) and diameter. As weld (75) progresses, some distance behind the weld pool, the welded area begins to cool below the weld area melting point and solidifies. Although not shown, welding processes will always have some form of shielding gases flowing around the weld area. These shielding gases protect the weld area from oxygen and other undesirable atmospheric contaminants such as nitrogen. Also, the process of the present invention allows for the addition of fluxing types of materials to the working fluid to improve the welding process, either added to the working fluid while in the heated crucible, or added to the feedstock (87) as an additive compound or laid down as powder as in submerged-arc welding.

Figure 3:
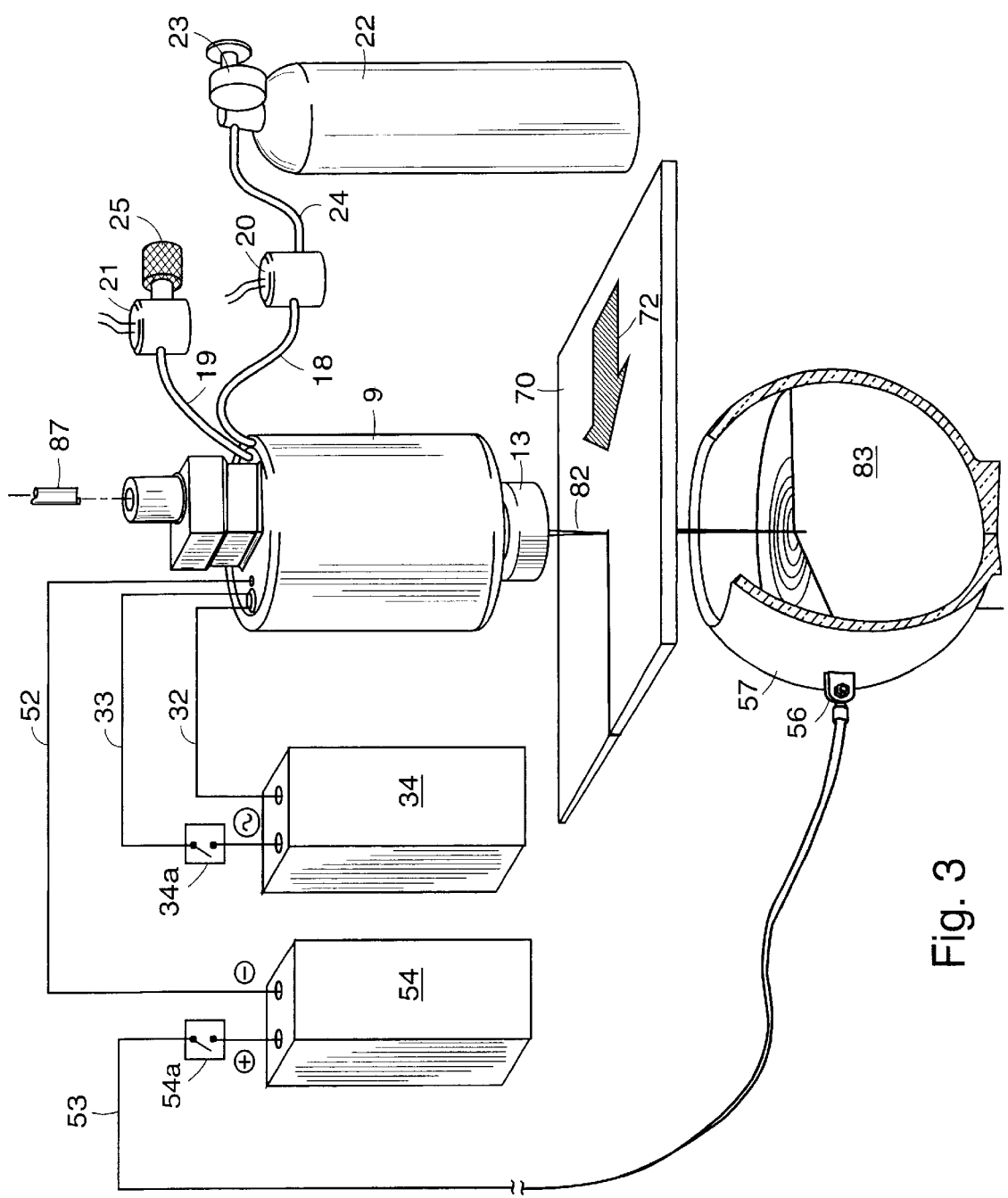
FIG. 3 shows a schematic view of an apparatus for cutting a workpiece according to another embodiment of the invention.

In one embodiment, cutting of non-metallic, non-conductive, and insulating materials can be accomplished by allowing the molten stream to collect in an electrically conductive pot as shown in FIG. 3. In this embodiment, it is not necessary for the workpiece to be electrically conductive. The current path for the stream heating is the same as in FIGS. 1a–1c except now the current flows through the stream (82), into the current collection material (83), through current collection vessel (57), through clamp (56) and back through lead (53) to power supply (54). The current collection material (83) can be completely molten or only partially molten and is made up generally of both the stream material and the workpiece material. Additional current collecting material (83) could be added to the current collection vessel (57) separately from the cutting process. An important feature of the current collecting material (83) is that it makes good electrical contact with the stream (82). The I²R heat addition to the stream would still takes place. The temperature of the stream at the top surface of the workpiece can be controlled, as in the embodiment, by the choice of working fluid, the amount of current passing through the stream, the flow rate of the stream, the diameter of the stream and the length of the stream from the workpiece to the inlet to the nozzle orifice (5). Workpiece (70) is being cut as it passes through the I²R heated stream (82) with relative motion (72) between the jet head (9) and the workpiece (70). This differs from the embodiment in that the work piece is not part of the I²R heating circuit.

Figure 4A:
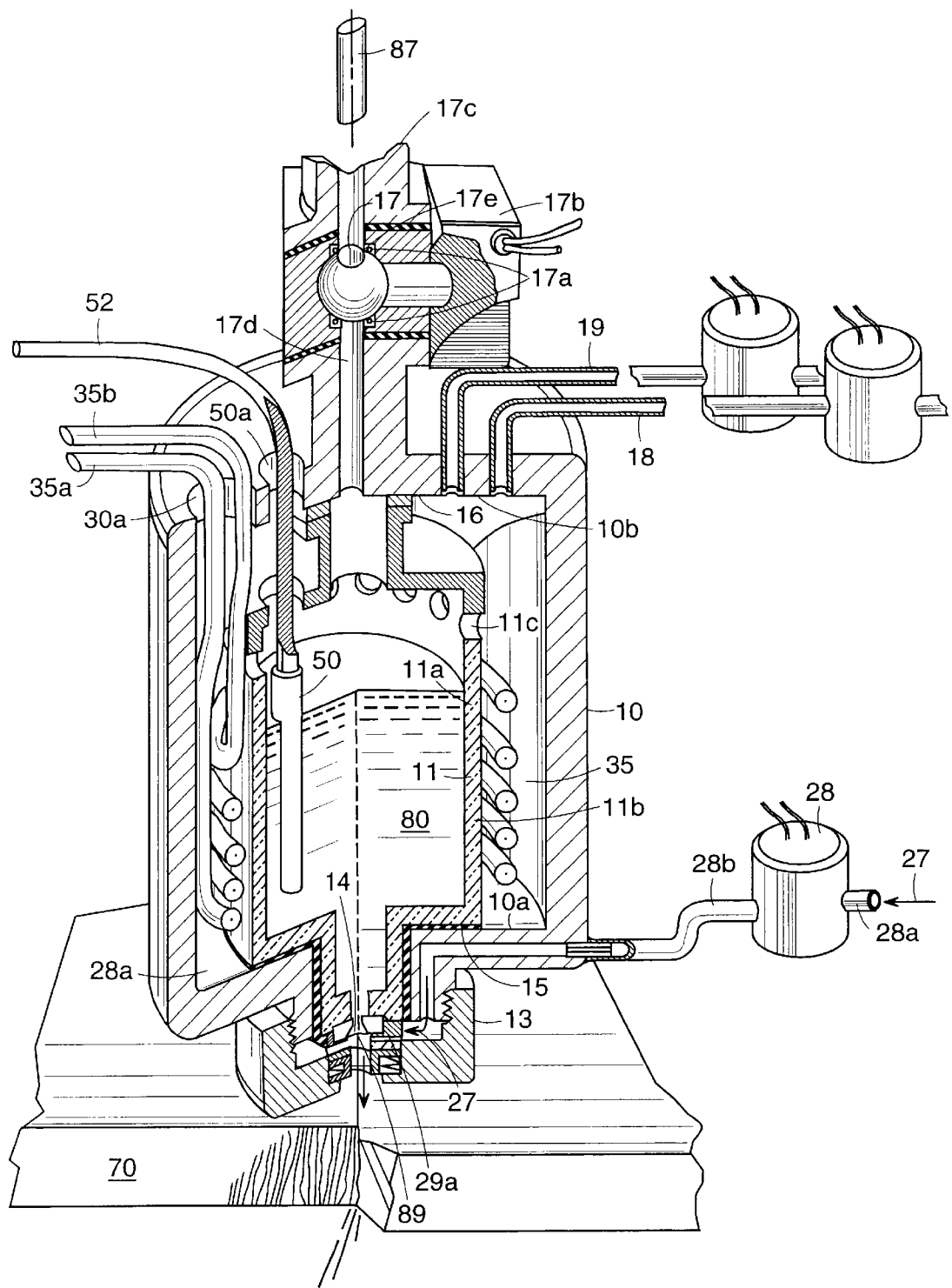
FIG. 4a shows a cross-sectional view of the jetting head according to another embodiment of the invention.
Figure 4B:
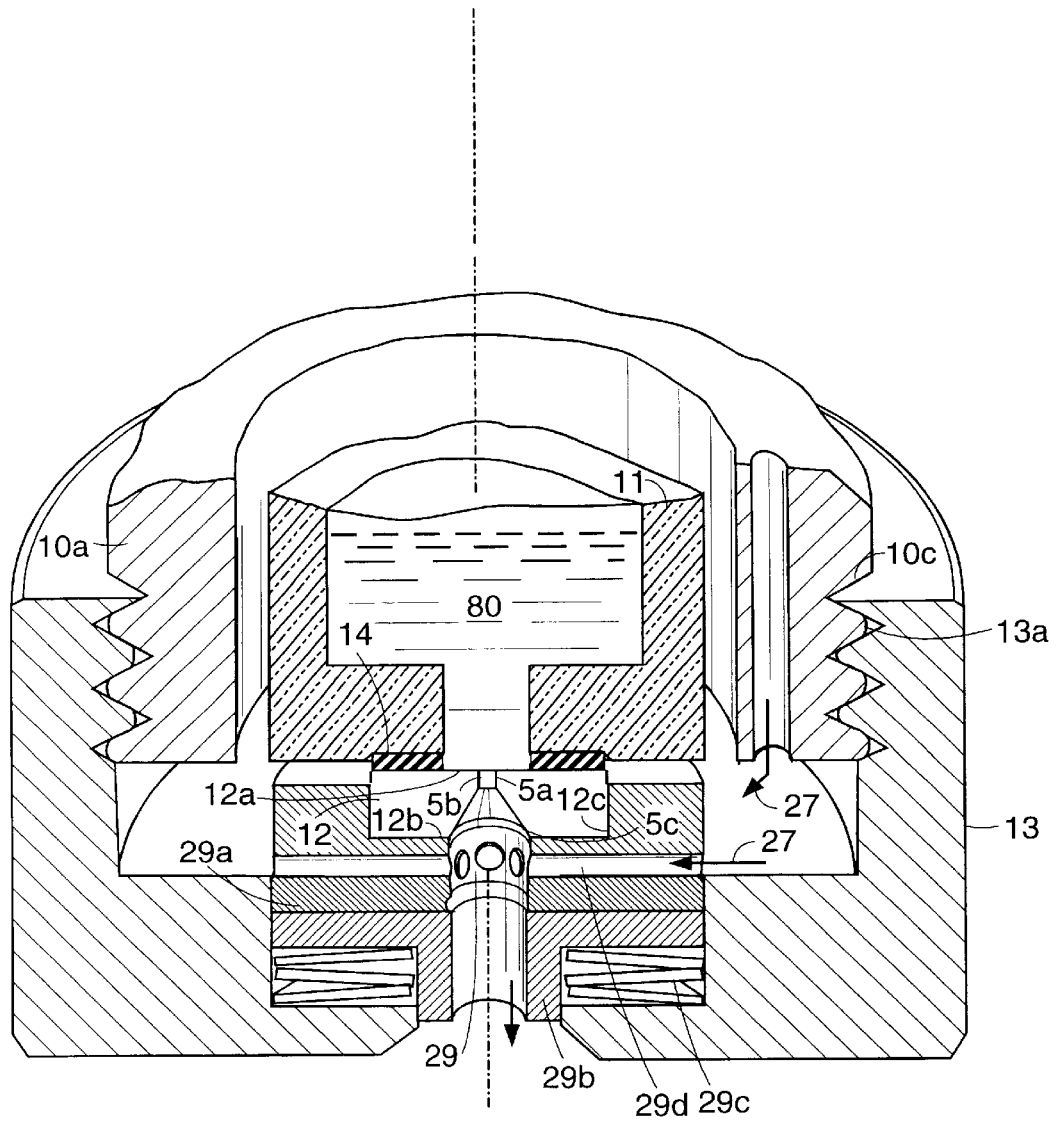

In another embodiment, an induction heated crucible, as shown in FIG. 4a, is used as a possible variation of the implementation of the invention. In this variation of the jetting head, the crucible heater (30) is replaced with induction heater coils 35 with an incoming coil tube (35a) and an outgoing coil tube (35b). The induction heater power supply and its cooling system (not shown), are used in this embodiment. Also incorporated into the implementation shown in FIG. 4a is the method of stopping the working fluid flow by use of a levitating force applied to the working fluid (80) by the induction forces caused by the heating coil (35). When a conducting working fluid is placed in an induction field, the induced current heats the metal conductor. It also creates an opposing magnetic flux that tends to push the metal working fluid into a region of lower field strength, i.e., out of the field (or coil). This pushing force may be computed using the 'Lorentz' equation. If the induced magnetic field is uniform, there is no net force on the working fluid. A field gradient is needed to provide a lifting force. In one embodiment, this is accomplished by forming the coil (35) in a conical shape with the coils near the lower end of the crucible being smaller in diameter then the coils near the upper end of the crucible. In another embodiment, this is accomplished by forming the coil (35) with the coil near the lower end of the crucible in a closer packed relationship than the coil near the upper end, as shown in FIG. 4a. This levitating force creates a lifting (or levitating) force on the liquid metal fluid which overcomes the force of gravity acting on the liquid metal, preventing it from dripping or leaking. In this design, the stopping of stream (82) is caused by a combination of changing the pressure in pressure vessel (10) and the applied levitating force of the induction coil; there is no need for the plug rod (26) arrangement of the embodiment shown in FIG. 1b. The nozzle area is shown in FIG. 4b in the condition of no flow. FIG. 4b shows the liquid to be held in the nozzle orifice without exiting. This is due to the levitating forces of the operating induction coil (35).

Also, shown in the embodiment in FIG. 4b is an improvement to the process by the addition of gas shielding at the nozzle exit. In this embodiment, a nozzle disk (12) is held in position by the assembly consisting of a shield gas disk (29a), a down stream portion (29b), and springs (29c). Shielding gas flow (27) is applied to the nozzle exit area (29). Shield gas flow (27) flows from the shield gas source (not shown) and flow regulator (not shown) through an on/off valve (28) and connecting lines (28a) and (28b) to the nozzle area (29) through holes (29d) in the shield gas disk (29a). The main benefit of gas shielding is to reduce the effects of ambient air on both the working fluid stream (82) and on the workpiece(s). Although this shielding is not shown in the embodiment of FIG. 1b it is contemplated that this feature would most likely be applied to the embodiment.

Figure 5A:
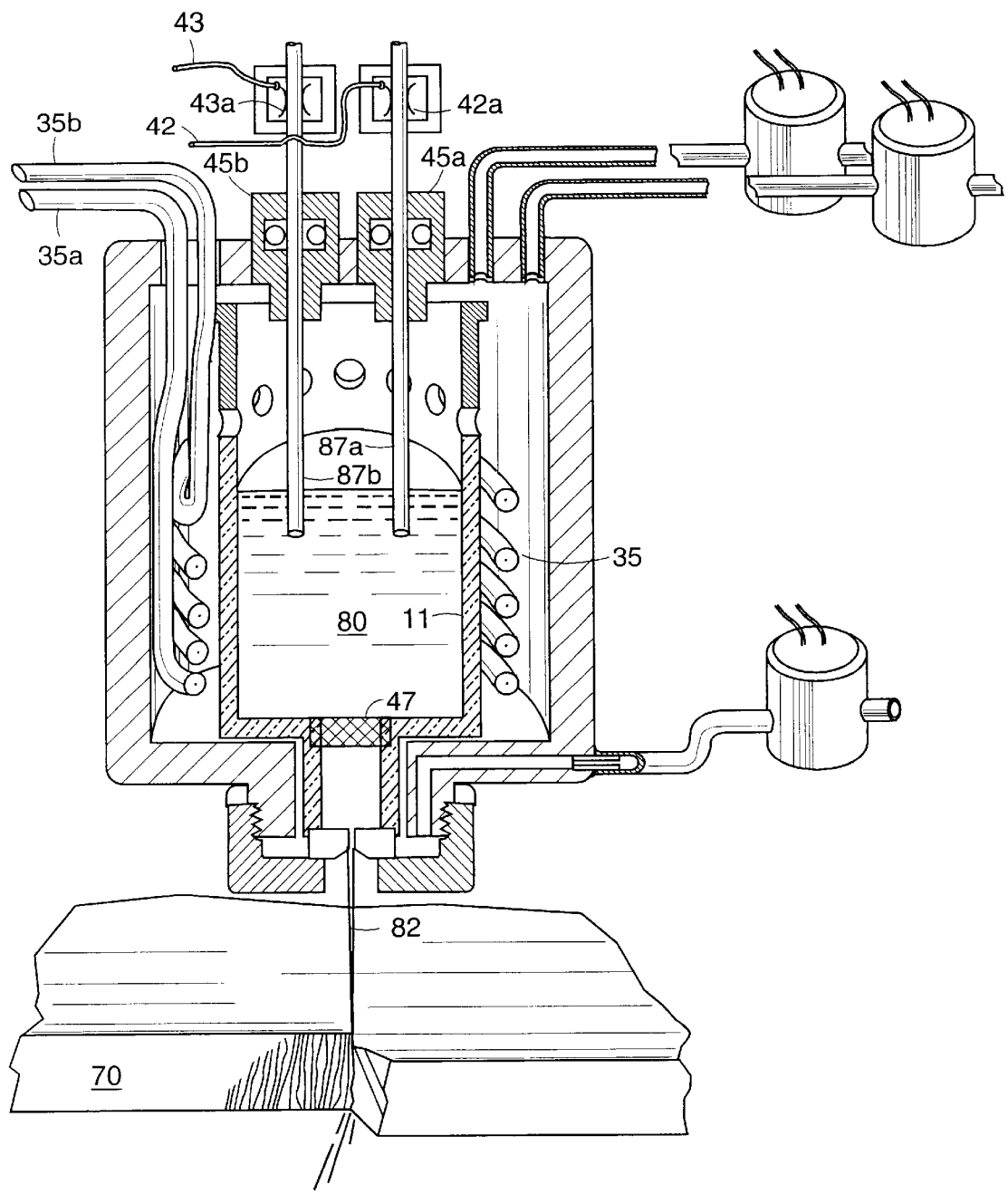
FIG. 5a shows a detailed cross-sectional view of the jetting head according to another embodiment of the invention.
Figure 5B:
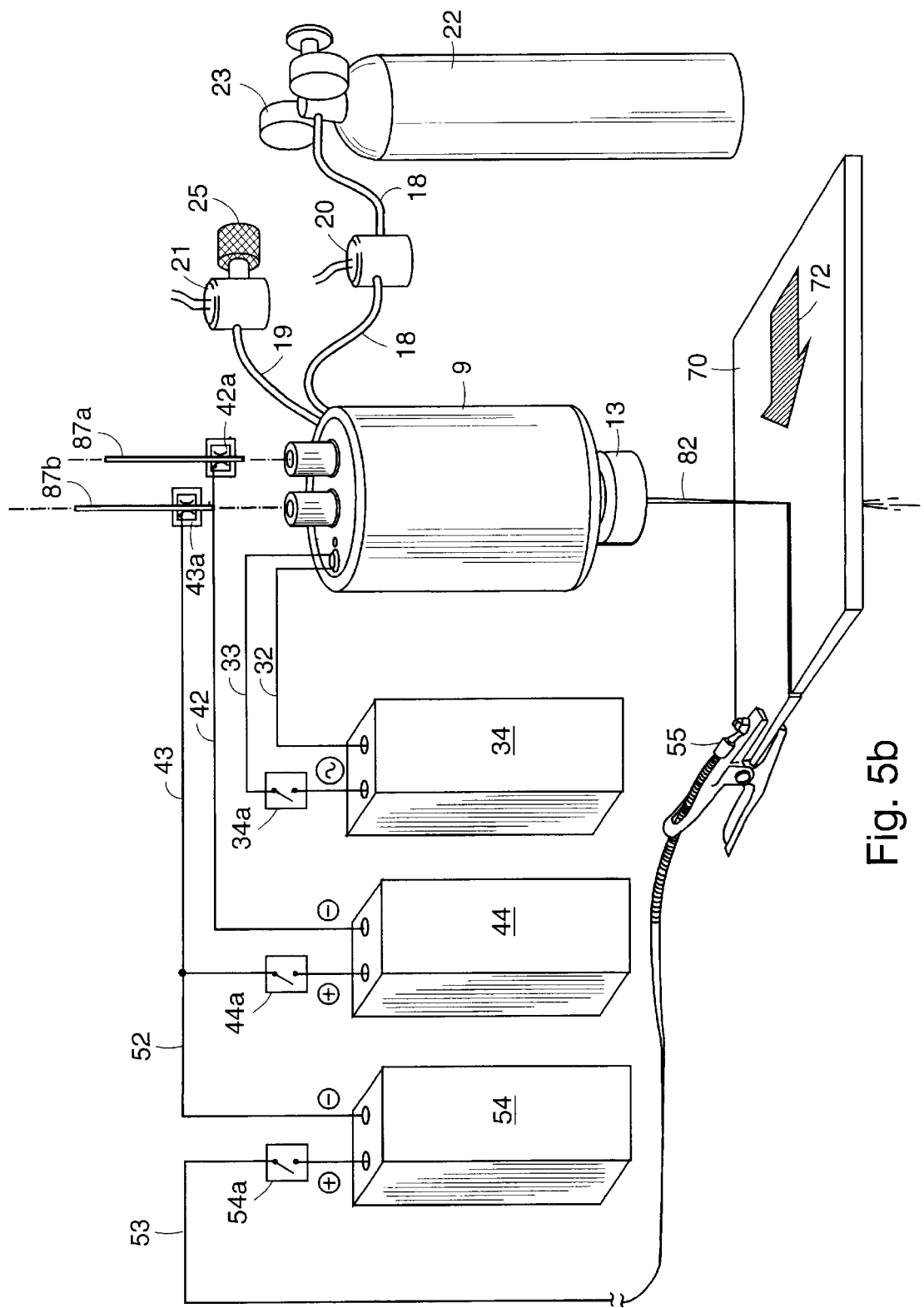
FIG. 5b shows a schematic view of an apparatus for cutting a workpiece according to one embodiment of the invention.

In another embodiment, an induction heated crucible and a feedstock heater, as shown in FIGS. 5a and 5b, are used as a possible variation of the implementation of the invention.

In this variation of the jetting head, the crucible heater (30) is replaced with induction heater coils 35, with an incoming coil tube (35a) and an outgoing coil tube (35b). The induction heater power supply and its cooling system (not shown), are used in this embodiment. Feedstock wires or rods 87a and 87b are fed through electrical contacts 42a and 43a and through pressure seals 45a and 45b. Contacts 43a and 42a are electrically connected electrical connection wires 43 and 42 respectively. Wires 42 and 43 are connected to the positive and the negative contacts of power supply 44. The feedstocks 87a and 87b are electrically connected together by driving them down into the conductive fluid 80 contained in crucible 11. The feedstocks 87a and 87b are heated resistively by closing contact switch 44a of power supply 44. By allowing this initial $I^2R$ heating of the feedstock 87a and 87b, via power supply 44, the overall power requirement for the induction heater 35 is reduced. The jet heating power supply 54 is connected to the workpiece 70 via clamp 55 and cable 53, through switch 54a, and is connect to the jet 82 via cable 52, which is connected to power supply 44 via cable 43, which is in-turn connected to the conductive fluid via contact 43a and feedstock 87b. It is of course understood that power supply 54 could have been connected to the conductive fluid through cable 42 and the other feedstock 87a in the same manner as described.

In one embodiment, a filter 47 is placed in series with the jetting nozzle, the conductive fluid flows first through the filter and then flows to the nozzle where the jet is formed.

In one embodiment, in place of using a plug rod (26), sealing ball (26a), and actuator (26c) to prevent fluid flow during the "off" condition, a vacuum source is used to create a "suction" inside the vessel which would overcome the force of gravity acting on the liquid, preventing it from dripping or leaking.

In another embodiment, reversing the polarity of the stream heating power supply (54), or using AC power may prove useful in suppressing observed arcing and sparking on the workpiece surface, and minimizing workpiece oxidation.

In another embodiment, the present invention features methods of introducing the cutting fluid feedstock (87) into the pressure vessel (10) of the jetting head (9) including feeding the feedstock as either rod, wire, powder, or liquid metal. In one example, the feedstock is introduced into the pressure vessel under the full operating pressure.

In one embodiment, the invention features using an electrical current flow in a stream (jet) of metal to raise the stream temperature. In one example, the invention features the use of the liquid metal jet with added current ($I^2R$ heating) for the purposes of cutting and welding.

In one embodiment, the invention features the use of pure metals as the cutting fluids, including iron, aluminum, tin, nickel, titanium, gold, platinum, silver, magnesium, and copper, in combination with the $I^2R$ heat addition process.

In one embodiment, the invention features the use of low melting temperature metals having high boiling point temperatures for the cutting fluid, in combination with the $I^2R$ energy addition process. Examples of suitable cutting (working) fluid include but are not limited to: aluminum and aluminum alloys; tin and tin alloys.

In one embodiment, the invention features the use of the beneficial effects of alloying in the cut, which reduces the melting temperature of the workpiece in the vicinity of the metal jet and kerf front, in combination with the $I^2R$ heating process.

In one embodiment, the invention features the use of non-melting additions to the working fluid, such as, ceramic particles and refractory metal particles, which would help the cutting process by abrasion and enhancing heat transfer by stirring the interaction zone of the jet with the kerf front. The size of particles could range from about 0.2 to about 20 microns.

In one embodiment, the invention features the use of the levitating force of induction to stop the liquid metal fluid flow from the crucible.

In one embodiment, the invention features the technique of separating the high pressure requirement of a holding vessel from the high temperature requirement. This is done by placing both the holding vessel (crucible) and its heating source in the pressurizing environment.

In one embodiment, the invention features a technique of cutting non-metals or, in general, non-electrically conducting materials using the $I^2R$ heated liquid stream and by make the electrical connections to the stream at the up-stream side by contact to the working fluid in the pressure vessel (crucible) and on the down-stream side by contact by the stream to a separate current collection means located beneath the workpiece.

In one embodiment, the invention features the use of the present invention for the purpose of 'Surface Cladding' or 'Surface Welding', wherein a workpiece is coated (or cladded) with the working fluid. The working fluid stream is manipulated so as to coat the workpiece with the working fluid.

In one embodiment, the invention features the use of the present invention for the purpose of '3-D Forming', wherein a three dimensional structure is built-up (or formed) from the working fluid. The working fluid stream is manipulated under computer-code control, so as to build a freestanding, three dimensional structure with the working fluid. One principal reason why liquid metal jet presents a significant advantage over existing techniques in welding, coating, and forming is that the working material is liquid. This permits liquid of unique composition to be formulated in the crucible by supplying several types of feed mixture can be varied over a much larger range than in the solid state. When this liquid is rapidly cooled to the solid phase at rates of $10^3$–$10^6$ K/sec, an alloy with non-equilibrium composition is produced. This composition can be tailored to create solid materials with unique properties not generally available in conventional materials. As an example, special magnetic properties can be created in Fe-alloys. High-strength aluminum (and other lightweight metal) alloys can be made this way due to the refined grain structure that is produced. This is the technique that gas-assist metal atomization processes use to produce exotic metal powders that are used in the powder metal and thermal spray industry. The process of rapid cooling/rapid solidification of liquid metals is known to those skilled in the art.

The ability to accurately control the location and size of the deposition spot of the liquid metal jet (apparently, within microns) is an exceptional advantage when compared to existing spray technology that uses gas jets and powder. Such techniques produce deposition spot sizes on the order of millimeters and suffer from overspray and low deposition efficiency. Furthermore, the liquid metal jet diameter may be made sufficiently small (10's–100's of microns) that rapid cooling rates on the order of $10^3$–$10^6$ K/sec (often referred to as splat cooling) may be achieved. The approximate dimensions of the solidified metal deposit resulting from a single pass of the liquid metal jet over a surface may be estimated from droplet flattening and solidification models. Still another advantage of the liquid metal jet is the ability to incorporate particulate, or perhaps even fiber reinforcement into the deposit. The particulate may be introduced into the molten metal in the crucible, or they may be co-deposited by a second gas jet to the deposition site.

Equivalents

While the invention has been particularly shown and described with reference to specific refered embodiments, it should be understood by those skilled in the art that various changes in form and detail may be made therein without departing from the spirit and scope of the invention. For example, other methods of increasing a temperature of a metal jet in addition to those described herein can be used in accordance with the present invention to modify a workpiece.

What is claimed is:

1. A conductive fluid jet cutting system for modifying a workpiece comprising:
   a dispenser for dispensing a jet stream of an electrically conductive fluid; and
   a power source including at least a first electrical connection to the fluid within the dispenser and a second electrical connection to the jet stream external to the dispenser.

2. The system of claim 1 wherein the dispenser comprises a jetting head.

3. The system of claim 2 wherein the jetting head comprises a crucible.

4. The system of claim 3 wherein the crucible comprises a top, a sidewall, and a bottom, wherein the top comprises an inlet and the bottom comprises an outlet.

5. The system of claim 3 wherein the crucible comprises one of boron nitride-zirconia-silicon carbide, Yttria-Stabilized-Zirconia, Magnesia-Stabilized-Zirconia, Calcia-Stabilized-Zirconia boron nitride, Cubic Zirconia, alumina, silica, silica composites and zirconium diboride.

6. The system of claim 3 further comprising a heater coupled to the crucible.

7. The system of claim 6 further comprising a second power supply electrically coupled to the heater.

8. The system of claim 6 wherein the heater comprises one of an AC resistance heater, a DC resistance heater, an induction heater, or a combustion burner-heater arrangement.

9. The system of claim 6 wherein the heater is an induction heater having a characteristic frequency that can be calibrated to the level of the conductive fluid.

10. The system of claim 3 wherein the crucible comprises a refractory material.

11. The system of claim 3 wherein the crucible comprises ceramic material.

12. The system of claim 3 wherein the crucible comprises a material selected from one of alumina, zirconia, boron nitride, and graphite.

13. The system of claim 3 wherein the crucible further comprises a conductive fluid filter.

14. The system of claim 2 wherein the jetting head comprises an inlet for receiving a feed stock of the conductive fluid.

15. The system of claim 4 wherein the jetting head comprises at least two inlets for receiving multiple feedstocks of the conductive fluid.

16. The system of claim 15 wherein a third power source is connected to at least one feedstock.

17. The system of claim 2 wherein the jetting head comprises a pressure containment vessel.

18. The system of claim 2 wherein the jetting head comprises an electrode disposed inside the crucible for establishing an electrical connection with the jet stream.

19. The system of claim 18 wherein said electrical connection comprises a feedstock of the conductive fluid.

20. The system of claim 2 wherein the jetting head comprises an exit orifice.

21. The system of claim 2 wherein the jetting head further comprises a nozzle.

22. The system of claim 21 wherein the nozzle comprises a disk having a through orifice.

23. The system of claim 22 wherein the disk comprises a material selected from one of Yttria-Stablized-Zirconia, Magnesia-Stabilized-Zirconia, Calcia-Stabilized-Zirconia, boron nitride-zirconia-silicon carbide, boron nitride, Cubic Zirconia, Alumina, Silica, Silica Composites, Zirconium Diboride.

24. The system of claim 22 wherein the through orifice comprises a circular cross section.

25. The system of claim 1 wherein the conductive fluid comprises mild steel, aluminum, aluminum alloy, tin, stainless steel, iron, cast iron, tool steel, copper, zinc, gold, silver, or platinum.

26. A conductive fluid jet cutting system comprising:
   a jetting head including an inlet for receiving a feed stock of a conductive material and an exit orifice for dispensing a jet stream of a conductive fluid;
   a heater coupled to the jetting head; and
   a power source including at least a first electrical connection to the fluid within the dispenser and a second electrical connection to the jet stream external to the dispenser providing a current to the jet stream to increase a temperature of the jet stream.

27. A crucible for a conductive fluid jet cutting system, wherein the crucible comprises side walls and a base, a portion of the crucible being formed of a zirconium containing compound that is electrically conductive and is resistant to dissolving in the presence of a metallic melt, the crucible being configured to allow a current from a power supply to flow from the portion of the crucible to a conductive fluid being dispensed from the crucible.

28. The crucible of claim 27 wherein the metallic melt comprises one of iron, iron containing compound, and aluminum.

29. The crucible of claim 27 wherein the crucible comprises one of zirconia diboride and yitria-stabilized-zirconia.

30. A nozzle for a conductive fluid jet cutting system, wherein the nozzle comprises a disk-structure having an orifice, wherein the orifice is located at a center of the disk-structure, a portion of the nozzle being formed of a zirconium containing compound that is electrically conductive and is resistant to dissolving in the presence of a metallic melt, the nozzle being configured to allow a current from a power supply to flow through the nozzle to a conductive fluid jet being dispensed through the nozzle.

31. The nozzle of claim 30 wherein the metallic melt comprises one of iron, an iron containing compound, and aluminum.

32. The nozzle of claim 30 wherein the nozzle comprises zirconium diboride.

* * * * *

UNITED STATES PATENT AND TRADEMARK OFFICE
CERTIFICATE OF CORRECTION

PATENT NO. : 6,713,709 B2
DATED : March 30, 2004
INVENTOR(S) : Sanders et al.

Page 1 of 1

It is certified that error appears in the above-identified patent and that said Letters Patent is hereby corrected as shown below:

Column 17,
Line 59, after "claim", please delete "4" and insert -- 14 --.

Signed and Sealed this

Third Day of August, 2004

JON W. DUDAS
*Acting Director of the United States Patent and Trademark Office*